United States Patent
Jacot et al.

(10) Patent No.: US 10,293,446 B2
(45) Date of Patent: May 21, 2019

(54) SETTING-UP METHOD AND WORKPIECE MACHINING SYSTEM COMPRISING A SETTING-UP MODULE

(71) Applicant: Watch Out SA, Geneva (CH)

(72) Inventors: Philippe Jacot, Bevaix (CH); Sebastien Laporte, Thyez (FR)

(73) Assignee: WATCH OUT SA, Genève (CH)

( * ) Notice: Subject to any disclaimer, the term of this patent is extended or adjusted under 35 U.S.C. 154(b) by 0 days.

(21) Appl. No.: 15/580,775

(22) PCT Filed: Jun. 9, 2016

(86) PCT No.: PCT/IB2016/053380
§ 371 (c)(1),
(2) Date: Dec. 8, 2017

(87) PCT Pub. No.: WO2016/199044
PCT Pub. Date: Dec. 15, 2016

(65) Prior Publication Data
US 2018/0229340 A1  Aug. 16, 2018

(30) Foreign Application Priority Data
Jun. 11, 2015 (CH) ...................................... 0831/15

(51) Int. Cl.
*B23Q 17/00* (2006.01)
*B23Q 17/22* (2006.01)
(Continued)

(52) U.S. Cl.
CPC ......... *B23Q 17/2266* (2013.01); *B23Q 1/015* (2013.01); *B23Q 17/2233* (2013.01); *B23Q 17/24* (2013.01)

(58) Field of Classification Search
CPC .... B23Q 17/24; B23Q 17/2266; B23Q 17/22; B23Q 17/2233; B23Q 17/225; B23Q 17/2291; B23Q 17/2275
See application file for complete search history.

(56) References Cited

U.S. PATENT DOCUMENTS

| 3,282,138 A | 11/1966 | Stockmann et al. |
| 3,555,690 A | 1/1971 | Matthey |

(Continued)

FOREIGN PATENT DOCUMENTS

| CN | 1726115 A | 1/2006 |
| CN | 201017521 Y | 2/2008 |

(Continued)

OTHER PUBLICATIONS

International Search Report for PCT/IB2016/053380 dated Nov. 25, 2016.

(Continued)

*Primary Examiner* — Willmon Fridie, Jr.
(74) *Attorney, Agent, or Firm* — Pearne & Gordon LLP

(57) ABSTRACT

A workpiece machining system including a setting-up module and a machining module for producing workpieces. The setting-up module includes at least one first tool-holder attachment device for removably attaching at least one tool-holder and at least one first workpiece-carrier attachment device for removably attaching a workpiece-carrier. The machining module includes at least one second tool-holder attachment device for removably attaching at least one tool-holder and at least one second workpiece-carrier attachment device—for removably attaching a workpiece-carrier, such that the tool-holder and the workpiece-carrier—can both be transferred after setting up from the setting-up module to the machining module.

14 Claims, 8 Drawing Sheets

(51) Int. Cl.
*B23Q 1/01* (2006.01)
*B23Q 17/24* (2006.01)

(56) References Cited

U.S. PATENT DOCUMENTS

| | | | | |
|---|---|---|---|---|
| 3,625,097 | A | 12/1971 | Harkness | |
| 3,867,763 | A | 2/1975 | Wilkins | |
| 4,237,598 | A * | 12/1980 | Williamson | B23Q 7/1426 29/26 A |
| 4,240,207 | A | 12/1980 | Benjamin et al. | |
| 4,776,247 | A | 10/1988 | Kiya | |
| 4,880,220 | A | 11/1989 | Buchler | |
| 5,595,377 | A | 1/1997 | Tibbet | |
| 6,230,070 | B1 * | 5/2001 | Yodoshi | B23Q 1/267 700/162 |
| 7,347,765 | B2 * | 3/2008 | Koch | B23Q 7/1405 451/10 |
| 2003/0207742 | A1 * | 11/2003 | Hazlehurst | B21C 51/005 483/36 |
| 2010/0138006 | A1 * | 6/2010 | Mies | B23Q 15/26 700/57 |
| 2015/0367464 | A1 * | 12/2015 | Chen | B25J 11/0065 451/54 |
| 2016/0167184 | A1 * | 6/2016 | Burkhardt | B23Q 1/66 409/172 |

FOREIGN PATENT DOCUMENTS

| | | |
|---|---|---|
| DE | 1602821 A1 | 8/1970 |
| DE | 20013242 U1 | 12/2000 |
| DE | 10037532 A1 | 2/2001 |
| DE | 10252086 A1 | 5/2004 |
| DE | 102005047250 A1 | 4/2007 |
| DE | 102007042288 A1 | 9/2008 |
| DE | 202013002678 U1 | 3/2013 |
| FR | 2768072 A1 | 3/1999 |
| GB | 1243085 A1 | 8/1971 |
| IT | 1130508 B | 6/1986 |

OTHER PUBLICATIONS

First Office Action and Search Report for corresponding Chinese application No. 201680047129.5 dated Jan. 26, 2019.

* cited by examiner

SETTING-UP METHOD AND WORKPIECE MACHINING SYSTEM COMPRISING A SETTING-UP MODULE

TECHNICAL FIELD

The present invention concerns a method and a workpiece machining system comprising a setting-up module and at least one machining module intended for production.

PRIOR ART

The manufacturing of workpieces using machining modules (machine tools), in particular bar turning machines, automatic lathes, milling machines and transfer machines, typically comprises three separate phases:

In a first setting-up (or presetting) phase, the operator (for example, a bar turner operator) defines and tests, on a machining module, the machining plane, i.e. the sequence of operations and axis movements required in order to obtain the desired workpiece to be machined. For example, the operator ensures the most efficient machining plane possible is obtained, i.e. that which allows a given workpiece to be machined with a minimum of operations while avoiding collisions between the tools or with the workpiece. He chooses the tools to be used, and checks the quality of the workpieces obtained, for example the surface conditions, compliance with tolerances, etc.

In a second production phase, a batch of workpieces is produced on the preset machining module, with the parameters defined during the setting-up phase. This is the only productive phase; often, it is carried out 24 hours a day, with raw material being fed to the machining module by means of a bar feeder or a slug (blank) loader.

The production of a batch of workpieces may be interrupted, for example in order to produce another type of workpiece on the same machining module, to allow maintenance of the machine, etc., and then subsequently resumed. In this case, a starting phase is necessary in order to apply the parameters defined previously during the setting-up phase. This starting phase is faster than the setting-up phase.

Setting up is generally carried out on the machining module that is also to be used for production, in order to ensure that this production takes place with the preset parameters allowing the results tested during setting up to be obtained. This results in production being interrupted (i.e. idle time) and the production machine being immobilized for the duration of the setting-up period.

In order to test the machining parameters preset during the setting-up phase, specialized testing equipment is required, for example sensors, video cameras, etc., in order to measure the quality of the produced workpieces. This test equipment makes the price of the machining module more expensive. In the case of a facility with many machining modules, each module needs to be equipped with its own test equipment, at least for each setting-up phase. Although it is possible to remove the workpieces from the machining module in order to test them externally, this transfer further slows down the setting-up phase and the unproductive immobilization time of the module. Moreover, it does not allow for easy measurement of the characteristics of the workpiece during intermediate steps of the machining process.

Various solutions have therefore been proposed in the prior art in order to reduce the duration of this setting-up phase or the starting phase.

For example, DE1602821A1 describes an external setting-up device. This device allows setting up to be performed outside the machine tool, and the obtained parameters to be tested prior to the production phase on the production machine. Setting up is carried out using a tool mounted on a removable tool-holder that is then transferred to the production machine, in order to ensure that the production quality is not affected by a change of tool or a change in the positioning of the tools in their tool-holder.

U.S. Pat. No. 3,282,138A describes a machine tool with numerical control. A numerical positioning device helps correct the positioning of a removable tool-holder, recording the required positioning parameters on punched tapes. This solution has the same drawbacks as the document above and only allows tool positioning differences to be corrected.

U.S. Pat. No. 4,776,247 describes another numerical circuit that allows the position of the tools predetermined during setting up to be reproduced during production, thus reducing the starting time.

U.S. Pat. No. 3,625,097A describes a method for presetting tools in their tool-holder. The method implements an external setting-up device with removable tool-holders that can then be transferred to the production machine tool. The machine tool correctly reproduces the relative positioning of the tool-holders.

U.S. Pat. Nos. 3,555,690 and 4,240,207 concern a simulation device that allows a machine tool to be preset, implementing an external setting-up device.

U.S. Pat. No. 3,867,763A, FR2768072, U.S. Pat. Nos. 5,595,377 and 4,880,220 describe a device for presetting a machine tool, implementing an external setting-up device with removable tool-holders.

DE202013002678U1 describes a production machine with a production table equipped with a conveyor carrying several tool-holders each capable, in turn, of assuming a position in a series of adjacent processing stations.

DE102007042288A1 concerns a machine tool whose chassis forms a frame supporting a workpiece-carrier and one or more tool-holders. There are systems for ensuring the correct positioning of the workpiece-carrier and of the tool-holders on the chassis.

DE10 2005 047250 describes a workpiece production line with several aligned machining cells and a transportation device for transporting the workpiece that is to be machined. Each machining cell comprises tool-holders and workpiece-carriers. There is relative position compensation between the tool-holder and the workpiece-carrier with which it is associated.

DE 200 13 242 U1 can also be cited, which describes an optical device for adjusting tools, parts or measuring systems on machine tools.

These different solutions thus make it possible to set up and test a machining plane outside the machining module intended for production. They can also be used for testing tools and the mounting of same on the tool-holder, and for ensuring that the accurate mounting of the tools on their tool-holder is reproduced during production. However, these solutions do not guarantee the perfect reproducibility of results on the production machine; indeed, machining quality also depends on the characteristics and positioning of the workpiece-carrier on each module.

BRIEF SUMMARY OF THE INVENTION

One aim of the present invention is to propose a machining system and an external setting-up module that do not have the limitations of the prior art.

According to the invention, these aims are achieved, in particular, by means of a workpiece machining system comprising a machining module intended for producing workpieces and a setting-up module, the setting-up module comprising at least one first tool-holder attachment device for removably attaching a tool-holder and at least one first workpiece-carrier attachment device for removably attaching a workpiece-carrier, and a first positioning control device for controlling the positioning of said at least one tool-holder relative to said workpiece-carrier, the machining module comprising at least one second tool-holder attachment device for removably attaching a tool-holder and at least one second workpiece-carrier attachment device for removably attaching a workpiece-carrier, and a second positioning control device adapted to check the positioning of said at least one tool-holder relative to said workpiece-carrier, such that the tool-holder and the workpiece-carrier can both be transferred, after setting up, from the setting-up module to the machining module.

This solution has the particular advantage over the prior art of allowing not only the transfer of the tool-holder, but also of the workpiece-carrier, between the setting-up module and the machining module. This ensures that machining is carried out with the tool-holder and with the workpiece-carrier previously tested during setting up; any faults in the workpiece-carrier, for example inaccuracies in positioning, concentricity, etc., can thus be measured during setting up, and corrected or compensated for during production.

This solution also allows setting up to be carried out as a background task, on an external setting-up module, without taking over the machining module intended for production.

In a preferred embodiment, the setting-up module comprises a first positioning reference for controlling the positioning of at least one tool-holder relative to the workpiece-carrier. The machining module comprises a second positioning reference that can be used to check the positioning of at least one tool-holder relative to the workpiece-carrier. This makes it possible to compensate for errors in the positioning of the tool-holder, or of each tool-holder, with respect to the workpiece, during setting up on the setting-up module and during machining.

The tool-holder can be removably attached to a slide. To this end, it can comprise, for example, removable attachment means, for example one or more pins, or portions, for example reference holes or surfaces, that are capable of engaging with the movable slide.

The tool-holder can comprise several tools attached in a removable manner.

The positioning reference provided on the machining module helps ensure the relative positioning of the tool-holder and the workpiece-carrier is identical to that applied during setting up on the setting-up module and/or compensate for positioning differences. In this way, it is possible to control the relative positioning of the tool-holder and the workpiece-carrier, and therefore the relative positioning of the workpiece and the tool, regardless of the positioning of the machining module relative to the frame.

The positioning system on the setting-up module can be arranged to allow the distance between the position of the tool-holder and a reference linked to the workpiece-carrier to be measured, and to store this distance. Similarly, the actual direction of movement of the tool-holder (for example, when an instruction is issued to move in a given direction) can be measured and stored.

This is referred to as pinning the workpiece-carrier with the tool-holder: these two components are always accurately aligned and positioned with respect to one another, at the same distance and with the same orientation, both on the setting-up module and on the machining module.

Similarly, in the machining module, the position and the direction of movement of the tool-holder in a reference frame linked to the workpiece-carrier are measured and compensated for with the reference values determined on the setting-up module. Any differences in positioning and/or orientation are measured and compensated for by corresponding movements of the tool-holder slide during machining.

Positioning control devices can be used to check the positioning of the tool-holder and the workpiece-carrier in a single X-Y plane, and optionally the direction of movement Theta in this plane. This avoids the difficulty of positioning and orienting along the Z axis, which is generally less sensitive. This results in a device that is more economical and simpler to align.

In another embodiment, when it is also necessary to position the tools and workpiece accurately along the Z axis, the positioning control device can be designed to also allow accurate positioning in one or more planes including the Z axis.

The first and second positioning references can consist of optical targets. The alignment of these superimposed targets ensures the correct positioning of the tool-holder with the workpiece-carrier. The positioning control system can comprise a camera filming the superimposed targets, and a computer module for image analysis.

Other types of targets and other positioning control systems can be implemented, including systems based on a matrix sensor, or capacitive, inductive, resistive or mechanical systems, for example.

The positioning control device can be removable and linked to the tool-holder and to the workpiece-carrier, respectively.

The positioning control device can be attached and linked to the frame of the setting-up module or of the machining module.

The positioning control device can be partly attached and partly removable and linked to the tool-holder and to the workpiece-carrier, respectively.

In the case of an optical system, the measurement can be carried out by checking the position of workpieces submerged in a liquid, for example in oil. This helps prevent measurement errors caused by the possible spraying of cutting fluid or the presence of chips or dirt.

The setting-up module can comprise a camera or a high-resolution sensor not provided on the machining module, in order to set up the machining on said setting-up module, check the quality of machining obtained, and save on the installation of high-resolution sensors of this kind on all of the machine-tools of a facility.

The material carrier can be a guide bush of a turning machine.

The material carrier can be a clamp or a mandrel.

The material carrier can be a pallet or a pallet holder.

It is also possible to incorporate or attach the target to the workpiece to be machined.

In a setting-up module for the setting up of a machining process, in a possible embodiment, such a setting-up module comprises:

at least one first tool-holder attachment device for removably attaching a tool-holder;

at least one first workpiece-carrier attachment device for removably attaching a workpiece-carrier;

the positioning of said tool-holder relative to said workpiece-carrier being controlled.

The invention also concerns a machining process for machining workpieces using a machining module for producing workpieces and a setting-up module, comprising:

setting up the machining process by means of the setting-up module;

transferring at least one tool-holder and at least one workpiece-carrier from the setting-up module to the machining module;

machining workpieces on said machining module by means of said workpiece-carrier and said tool-holder, and a step of checking the relative positioning of the workpiece-carrier and the tool-holder or holders on the setting-up module and on the machining module, in order to ensure on said machining module a positioning between said at least one tool-holder and said workpiece-carrier which is identical to that applied between said at least one tool-holder and said workpiece-carrier during setting up on the setting-up module.

BRIEF DESCRIPTION OF THE FIGURES

Implementation examples of the invention are indicated in the description shown by the appended figures in which.

DETAILED DESCRIPTION

Figure 1:
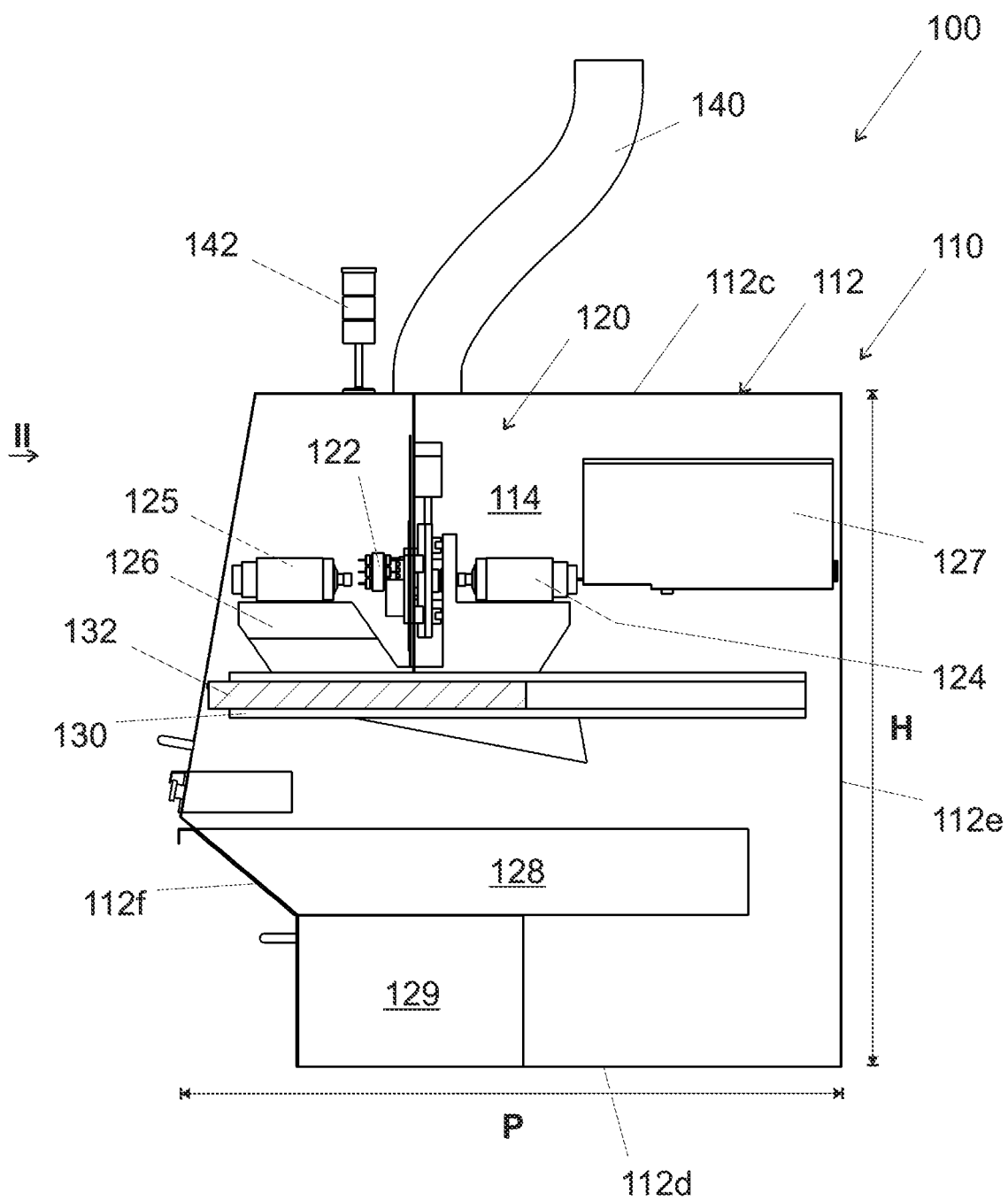
FIG. 1 shows a cross-sectional view of a machining module according to an embodiment of the invention.

The machining module 110 shown in FIG. 1 forms a compact unit, delimited by a protective cover 112 constituting a closed casing delimiting an enclosure 114 that can be relatively tightly sealed. This protective cover 112 comprises two vertical sidewalls 112a and 112b that are parallel to each other, a horizontal top wall 112c parallel to a bottom wall linked to the frame 112d, a vertical rear wall 112e, and a front wall 112f having several panels comprising a front door.

A window in the front wall 112f can be used for viewing the enclosure 114 containing, in particular, a machining assembly 120. This machining assembly 120 comprises at least one tool-holder 122, a spindle 124 and a counter-spindle 125. The tool-holder or holders 122 are removably mounted on a motorized movable slide or comb, as seen below.

The machining assembly 120 is mounted on a movable slide 130. In the figure, this movable slide 130 is in the form of a drawer. The slide 130 may form a receptacle capable of recovering any lubricating liquid, in particular oil, and chips of material resulting from the machining of a workpiece by the machining assembly. In order to allow said movable slide 130 to be moved out of the enclosure 114 and moved back into the enclosure, said slide is mounted on guide means 132. In particular, these guide means 132 can be in the form of rails.

The machining assembly 120 is arranged on a support base 126, on which the spindle 124 and the counter-spindle 125 are mounted, along with the removable tool-holder or holders 122. The support base 126 is received directly on the movable slide 130. Therefore, it can be seen that it is possible to change a complete machining assembly 120 of a machining module, simply by separating the support base 126 from the movable slide 130, and positioning, in the same location, a new support base 126 equipped with another machining assembly 120.

The machining module 110 also comprises an electrical cabinet, which is not shown in the figure, located on the rear wall 112e, for example. This electrical cabinet is arranged in the enclosure 114, or outside the enclosure 114. The enclosure 114 also comprises a chip tray 128, under the movable slide 130, and an oil pan 129, under the chip tray 128. In order to recover the oil and chips in the dedicated tray 128 and pan 129, the bottom of the slide 130 is provided with holes. A chute secured to the slide can be provided in order to guide the chips.

Also, the machining module 110 is provided with a fume extraction system present in the enclosure and equipped with a fume extraction chimney 140.

In order to help visually control the state of operation of each machining module 110, a visual indicator of the state of operation, such as a signalling lamp 142 (see FIGS. 1 to 3), is optionally provided.

The machining module 110 further comprises a magazine of bars to be machined 127 situated in the enclosure 114, at the rear of the machining assembly 120. This magazine of bars to be machined 127 supplies the machining assembly 120 bar by bar, in the same way as a weapon cartridge magazine. This magazine of bars to be machined 127 thus forms a bar feeder for the machining assembly 120, supplying the workpiece-carrier 123 with the raw material from the rear of the machining module 110 (on the right in the figures). Batches of bars of different diameters, and/or of different materials that are already ready, allow the operator to reload the magazine 127 quickly and easily.

The bars may be shorter than 1 meter in length. When the bars to be machined are quite short, not only is the floor space requirement of the magazine 127 reduced, but the vibrations during the machining of the bar are also reduced, which ensures the stability of the machining process and therefore good quality machining. Moreover, short bars can be moved forward to the workpiece-carrier 123 without needing any specific guiding.

Figure 2:
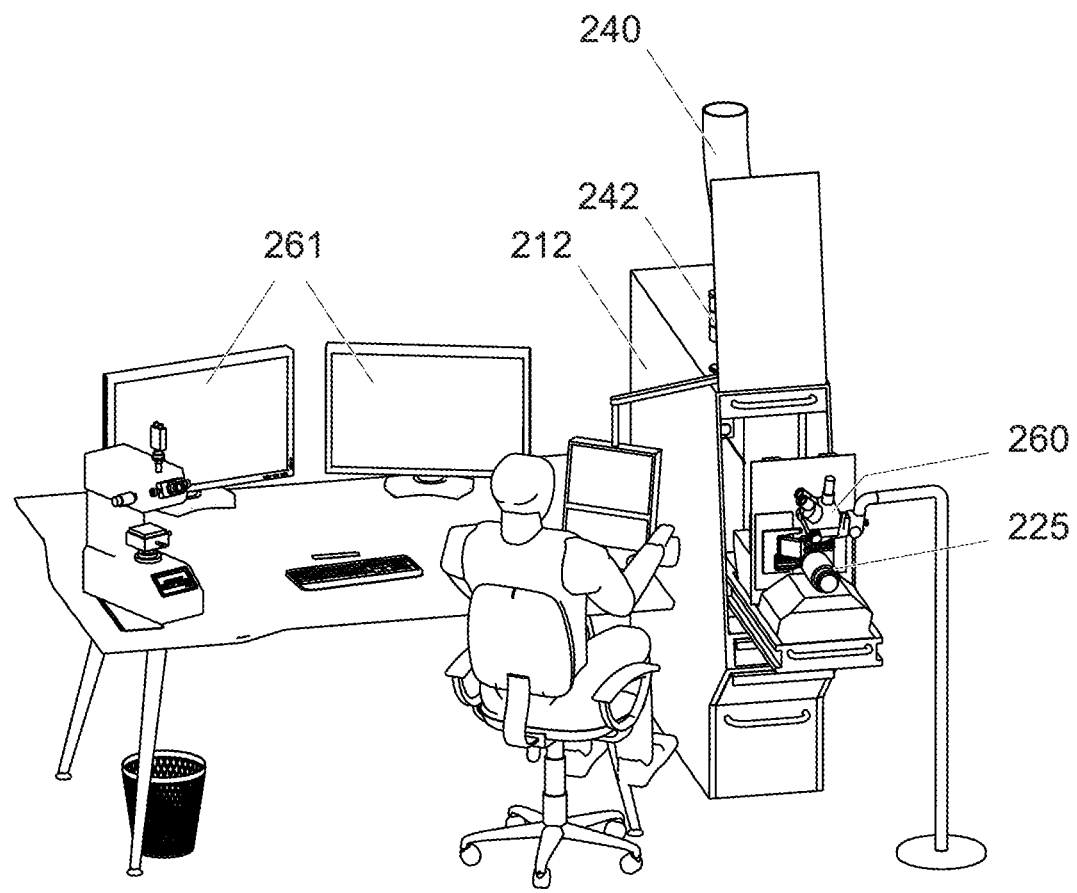
FIG. 2 shows a perspective view of a setting-up module according to an embodiment of the invention.
Figure 3:
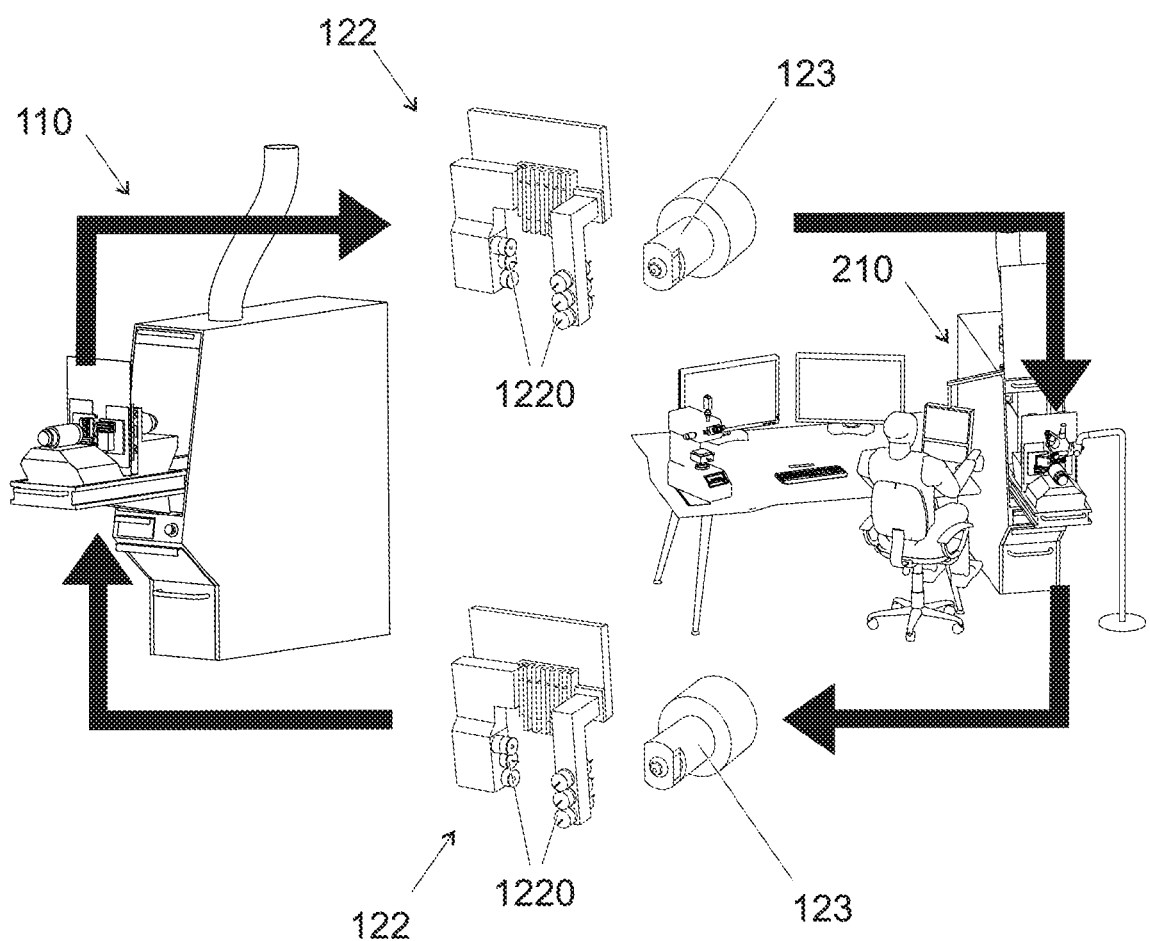
FIG. 3 shows, schematically, the transfer of the tool-holder and the workpiece-carrier between a setting-up module and a machining module.

FIG. 2 shows a setting-up module 210 according to an embodiment of the invention. A number of elements of this setting-up module are similar or identical to those of the machining module 110 and will not be described in further detail. The setting-up module 210 comprises, in particular, a slide 230 that is movable in the protective cover 212 that allows the removal or insertion of the machining elements, in particular a spindle similar to the spindle 124 with its workpiece-carrier, a counter-spindle 225 and the tool-holders detailed below. The element 240 is a fume extraction chimney, and 242 is a light indicating whether the setting-up module is operating or stopped. All the other elements of the machining module described in relation with FIG. 1 can be present in the setting-up module. Although this module is not intended for the mass production of large quantities of workpieces, it is nevertheless possible to simplify certain elements intended for high-speed production or mass production; for example, it is possible to provide a smaller or slower bar feeder, smaller oil recovery pans and air recovery containers, etc.

Moreover, the setting-up module 210 comprises at least one high-resolution camera and/or at least one sensor, not provided on the machining module 110, in order to set up the machining on said setting-up module and check the quality of the workpieces produced. This sensor can, for example, comprise a feeler, a surface indicator, a gauge, a height-measuring column, a vision system based on one or more high-resolution and/or high-frequency cameras, etc. The measurement results can be displayed on one or more screens 261.

The tools are distributed into tool groups 1220, each tool group comprising one or more tools next to each other. One or more tool groups are secured to a same tool-holder 122. The machine can comprise several tool-holders 122. At least one of said tool-holders is removably mounted, for example using pins, on a movable slide (referred to as a comb) of the setting-up module 210 or of the machining module 110. This means it is possible to transfer a tool-holder 122 from one module to the other, as shown schematically in FIG. 3. Similarly, the workpiece-carrier 123 is removably mounted, using an attachment device 1232, on the setting-up module 210 and on the machining module 110, such that it can be transferred from one module to the other. Position correction devices can optionally be used to compensate for the relative position of the or of each tool-holder with respect to the workpiece-carrier, as disclosed below.

One or more tools can be removably mounted on the corresponding tool-holder. The relative position of each tool with respect to the tool-holder 122, and/or the position of the cutting edge, can be measured and stored numerically, in order, for example, to apply a suitable numerical correction in case of a placement error, by means of measurement and correction elements known per se and different from the position compensation means of the tool-holder.

The workpiece-carrier 123 can, for example, comprise a guide bush, i.e. an element capable of guiding a bar of material held by the spindle, a mandrel, or a clamp capable itself of holding the material. Optionally, the workpiece-carrier comprises a guide bush that can be converted into a clamp.

After the setting up of a machining plane, the removable tool-holder 122 and the removable workpiece-carrier 123 can therefore be transferred from the setting-up module 210 to the machining module 110. This ensures that the machining will be carried out with the tool-holder and with the workpiece-carrier that allowed the qualities and results tested and approved during setting up to be obtained. In this way, faults resulting from changing tool-holders or changing the workpiece-carrier are avoided. Optionally, a tool-holder and a workpiece-carrier used for the setting up of a specific workpiece are associated with said workpiece and with the workpiece programme of same in an inventory, and used only for machining said workpiece; this kit is stored between the machining of two batches of said workpiece.

Figure 4:
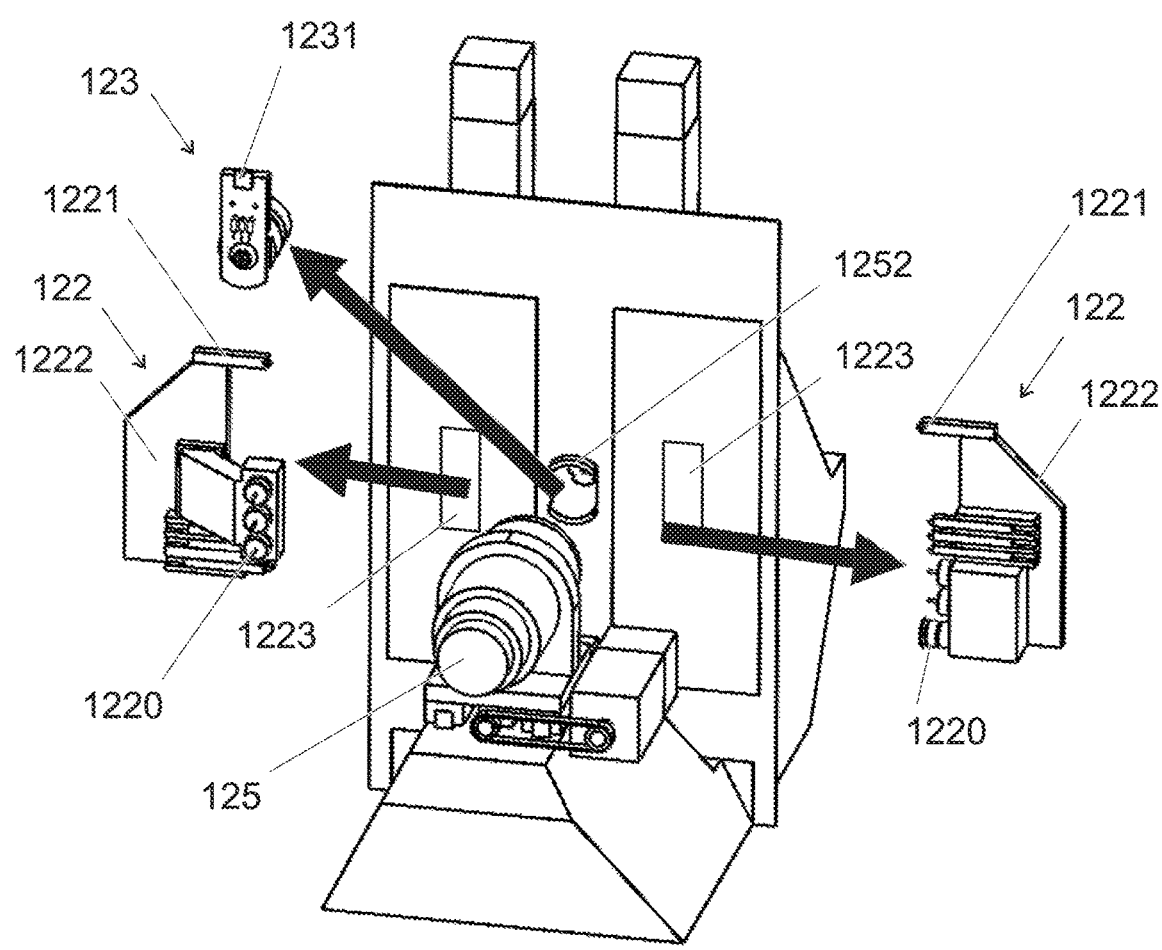
FIG. 4 shows, schematically, the mounting of the tool-holders and the workpiece-carrier on a setting-up module or on a machining module.

FIG. 4 shows, schematically, the mounting of two tool-holders 122 and one workpiece-carrier 123 on a module, for example on a setting-up module or on a machining module. Each tool-holder 122 is attached to a slide of the module 110 or 210 by means of an attachment device 1223, in such a way as to be able to move and correct its position in a motorized manner. Errors in the positioning of the tool-holder 122 relative to the slide, or differences in positioning relative to the positioning on the setting-up machine, are thus compensated for by modifying the movement of the slide in a corresponding manner.

Each tool-holder 122 further comprises a positioning reference 1221, for example but not limited to an optical target mounted on a target carrier 1222, as disclosed below. Optionally, several different positioning references can be provided when the machine comprises several tool-holders 122 on several slides (combs). Similarly, the workpiece-carrier 123 is mounted by means of an attachment device 1232 and also comprises a positioning reference 1231, for example another optical target detailed below. The relative positioning of the positioning references linked to each tool-holder and to the workpiece-carrier can be controlled, for example by means of a vision system linked to the frame and which makes it possible to measure the distance along the X and Y axes between the positioning references 1221 and 1231. In a possible embodiment, the system controls a movement of the tool-holder slide in a predetermined direction and measures the difference Theta between the actual direction of movement measured in the image and the target direction. It is therefore possible to compensate for orthogonality errors of the X and Y axes.

The errors in positioning and direction of movement measured in this way are compensated for, for example by means of the axes of said tool-holder, in order to obtain, during machining, relative positioning and orientation of the tool-holders and of the workpiece-carrier that correspond to the values used during setting up.

Figure 5:
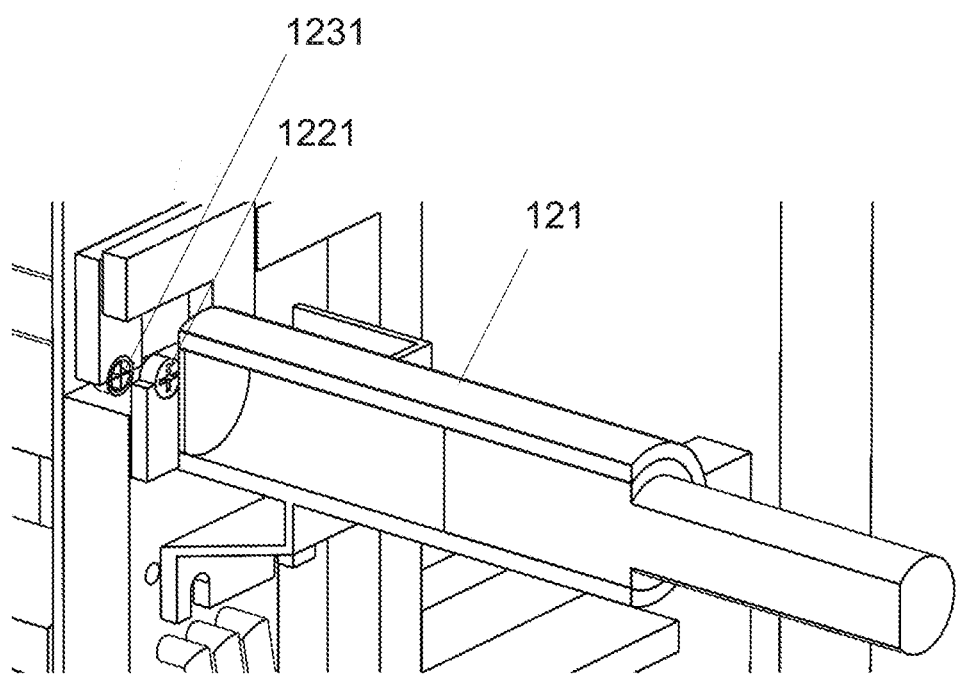
FIG. 5 shows a cross-sectional view of an example of a positioning control system according to an embodiment of the invention.

FIG. 5 shows a perspective view in partial cross section of the two positioning references 1221 and 1231 linked respectively to the tool-holder and to the workpiece-carrier and superimposed when they are mounted on one of the modules 110 or 210. A fixed positioning control device 121 linked to the frame of the module 110 or 210 can be used to check the correct relative positioning between the two targets 1221 and 1231, and to compensate for any error or difference in this positioning relative to the positioning used on the setting-up machine. The positioning control device 121 can consist of a camera provided with a microscope lens, or an optical system capable of capturing an image of the different superimposed optical targets 1221 and 1231, in order to check their relative positioning. A computerized vision system can be used to measure the distance x, y and the error in the direction of movement Theta between the targets 1221 and 1231, in order to compensate for said error accordingly.

It is also possible, though less advantageous, to provide a positioning control device, for example a camera, secured to a tool-holder or to the workpiece-carrier. However, this solution requires a control device for each tool-holder or carrier.

Similarly, it is also possible to provide a target linked to the workpiece-carrier on the counter-spindle 125, and a target linked to one or more tool-holders in counter-operation, in order to control the positioning of these elements relative to each other and/or relative to the main workpiece-carrier 123.

Figure 6:
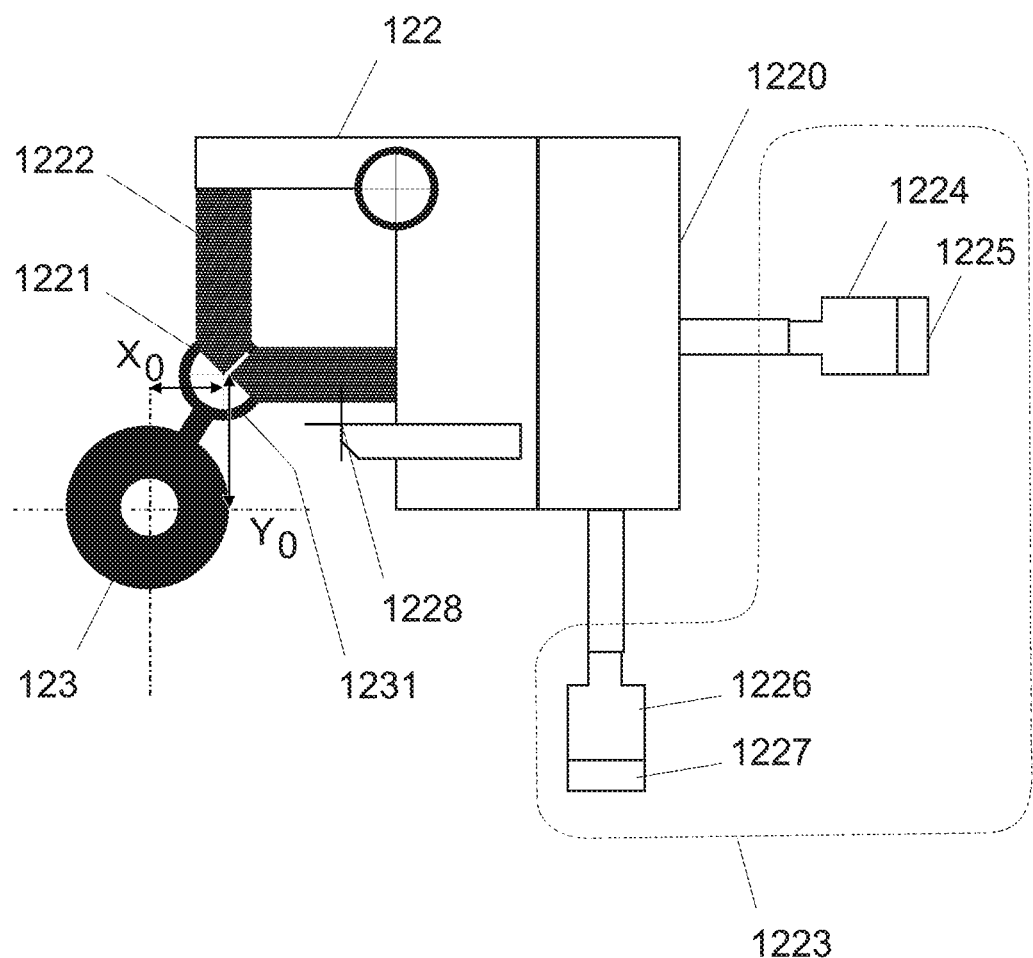
FIG. 6 shows, schematically, an example of a positioning control system according to an embodiment of the invention.

FIG. 6 shows, schematically, the superimposition of the target 1231 associated with the workpiece-carrier 123 (for example a guide bush or a spindle) and the target or targets 1221 associated with one or more tool-holders 122. As shown, the target 1231 associated with the workpiece-carrier is mounted in an offset position relative to the guide bush 123, the axis of said target nevertheless being parallel to that of the guide bush. Similarly, the target 1221 mounted on each tool-holder 122 is offset by means of the target carriers 1222. The position correction device of the tool-holder comprises a motor 1224 provided with an encoder 1225 that can be used to correct the position $X_m$ of each tool-holder along the X axis, so as to move the tool-holder during machining to take into account any X-positioning errors of the targets 1221-1231. Similarly, a motor 1226 provided with an encoder 1227 can be used to modify the position $Y_m$ of each tool-holder along the Y axis, in order to correct any Y-positioning errors of the targets 1221-1231. The element 1220 is a tool group on the tool-holder movable along X and Y, while the tip of one of the tools mounted on said tool-holder is indicated by reference 1228. As shown, the position of this tip relative to a reference of the tool-holder can be measured and stored by computer. A correction in orientation in the X-Y plane can also be envisaged.

The targets 1221 and 1231 can, for example, comprise cross- or star-shaped patterns, or other patterns that help check the alignment of the superimposed targets along the linear X and Y axes, as well as the direction of movement Theta of the target 1231 in a reference frame linked to the workpiece-carrier. These patterns can, for example, be printed by photolithography on a glass substrate. It is also possible to print a unique identification for each target, for example a serial number, a bar code, a datagram, etc., in order to easily identify each target and therefore the tool-holder or workpiece-carrier associated with said target, and therefore ensure that a particular workpiece is correctly machined with the tool-holder and associated workpiece-carrier. The unique tool-holder identification can also be used to find, in the computer memory of the numerical control 1211, the parameters associated with said tool-holder, for example the offset values, zero values, etc.

Figure 7:
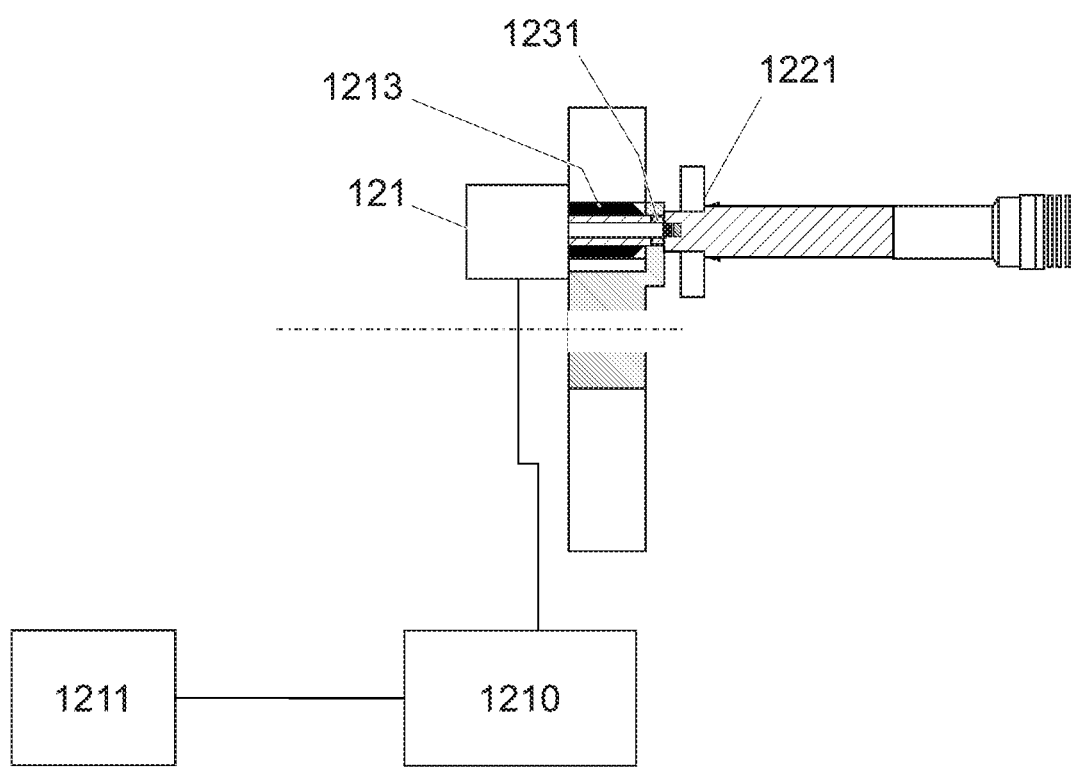
FIG. 7 shows, schematically, a positioning control system according to an embodiment of the invention, the lighting being on the opposite side from the camera, with respect to the targets.

FIG. 7 shows, schematically, an embodiment of a positioning verification system. In this example, the positioning control device comprises a microscope lens 1213 and a CCD camera 121 to one side of the targets 1221 and 1231, and lighting 1212 to the other side of the targets. The light generated by the lighting 1212 passes through the superimposed targets and reaches the CCD camera 121, which captures an image or a sequence of images magnified by the lens 1213. A vision module 1210, for example a computer program, processes the images captured by the CCD camera in order to check the alignment of the targets. The results provided by this module can be transmitted to the numerical control 1211 that controls the setting-up module or the machining module, and used to control the motors 1226 and 1224 in order to move the tool-holder or holders during machining in such a way as to compensate for the error observed. A manual position correction mechanism, for example using micrometric screws, can also be implemented. In a variant, the positioning errors in the setting-up module are not corrected, or are not fully corrected, but are stored in relation with the targets in question, in order to reproduce this error during production on the machining module.

Figure 8:
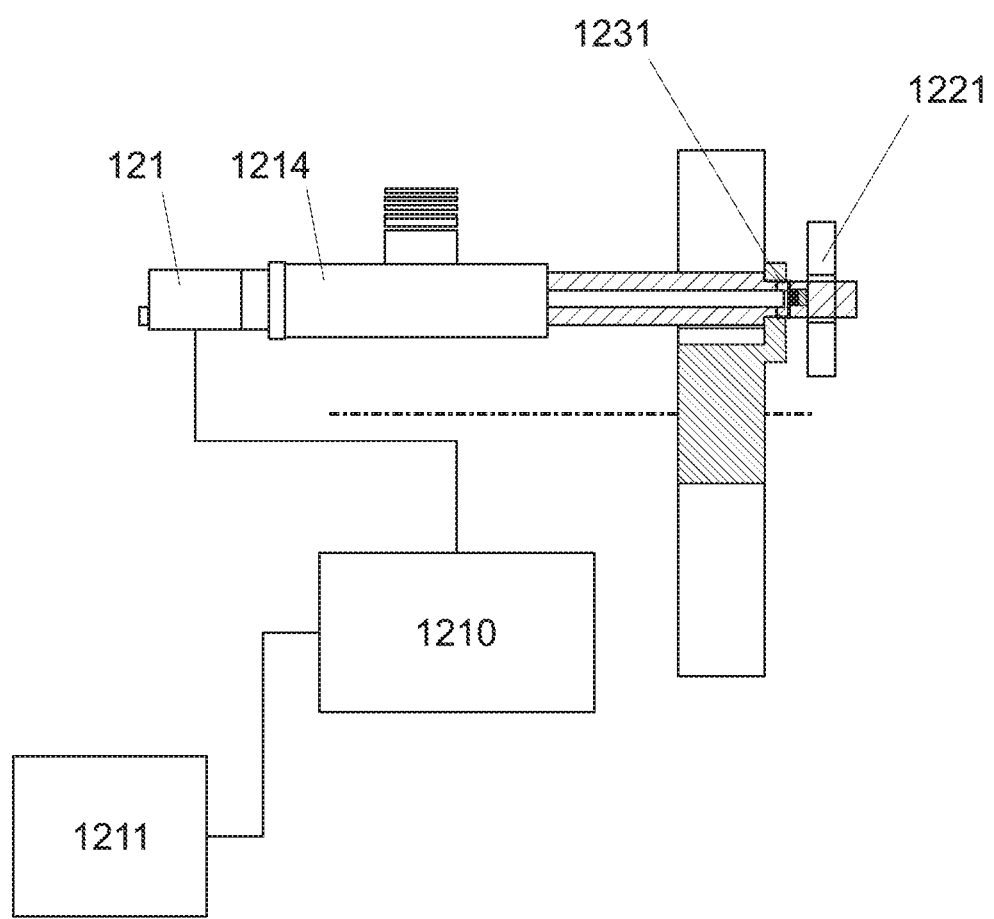
FIG. 8 shows, schematically, a positioning control system according to an embodiment of the invention, the illumination being on the same side as the camera, with respect to the targets.

FIG. 8 shows, schematically, another embodiment of a positioning verification system. In this example, the positioning control device comprises a microscope lens 1214 with coaxial lighting, and a CCD camera 121 on the same side relative to the targets 1221 and 1231. The light generated by the lighting is reflected by the superimposed targets and reaches the CCD camera 121, which captures an image or a sequence of images magnified by the lens 1214. As above, a vision module 1210, for example a computer program, processes the images captured by the CCD camera in order to check the positioning of the targets and perform or store a correction via the numerical control 1211.

Other positioning references could be envisaged for checking the positioning of the tool-holder or holders relative to the workpiece-carrier. As a non-limiting example, capacitive, inductive or magneto-resistive systems, or mechanical feelers, could be implemented for this purpose.

REFERENCE NUMBERS USED IN THE FIGURES

110 Machining module
112, 212 Protective cover
112a Sidewall
112b Sidewall
112c Top wall
112d Bottom wall linked to the frame
112e Rear wall
112f Front wall
114 Enclosure
120 Machining assembly
121 Positioning control device
1210 Vision module
1211 Numerical control
1212 Lighting
1213 Microscope lens
1214 Lens with coaxial lighting
122 Removable tool-holder
1220 Tool group
1221 Positioning reference of the tool-holder, for example target
1222 Target carrier
1223 Tool-holder attachment device
1224 X-position correction device of the tool-holder (motor)
1225 Encoder of the motor 1224
1226 Y-position correction device of the tool-holder (motor)
1227 Encoder of the motor 1226
1228 Tip of one of the tools
123 Workpiece-carrier (guide bush, mandrel and/or clamp)
1231 Positioning reference of the workpiece-carrier, for example target
1232 Workpiece-carrier attachment device
124 Spindle
125, 225 Counter-spindle
126 Support base
127 Magazine of bars to be machined
128, 228 Chip tray
129 Oil pan
130, 230 Movable slide
132 Guide rails
140, 240 Fume extraction chimney
142, 242 Signalling lamp
210 Setting-up module
260 Sensor or camera
261 Screens

What is claimed is:

1. A workpiece machining system comprising a setting-up module and a machining module for producing workpieces, the setting-up module comprising:
   at least one first tool-holder attachment device configured for removably attaching at least one tool-holder and at least one first workpiece-carrier attachment device configured for removably attaching a workpiece-carrier, said machining module comprising:
   at least one second tool-holder attachment device configured for removably attaching at least one tool-holder and at least one second workpiece-carrier attachment device configured for removably attaching a workpiece-carrier,
   wherein
      said setting-up module further comprises a first positioning control device configured for controlling the positioning of said at least one tool-holder relative to said workpiece-carrier,
      said machining module further comprises a second positioning control device adapted to check the positioning of said at least one tool-holder relative to said workpiece-carrier,
   such that the tool-holder and the workpiece-carrier can both be transferred after setting up from the setting-up module to the machining module, the second positioning control device thus making it possible to ensure on said machining module that the positioning between said at least one tool-holder and said workpiece-carrier is identical to that applied between said at least one tool-holder and said workpiece-carrier during setting up on the setting-up module.

2. The system as claimed in claim 1, wherein said first positioning control device provides reference values for the relative positioning between said at least one tool-holder and said workpiece-carrier.

3. The system as claimed in claim 1, wherein said first positioning control device and said second positioning control device are adapted to check the positioning of the tool-holder and the workpiece-carrier at least in a X-Y plane.

4. The system as claimed in claim 1, the tool-holder allowing several tools to be attached in a removable manner.

5. The system as claimed in claim 4, the first and second tool-holder attachment devices being each configured to allow a tool-holder to be removably attached to a movable slide.

6. The system as claimed in claim 1, the setting-up module comprising a measuring and storing device configured for measuring and storing the distance of the tool-holder with respect to a reference linked to the workpiece-carrier.

7. The system as claimed in claim 1, the setting-up module comprising a detector which detects the direction of movement of the tool-holder in a reference frame linked to the workpiece-carrier.

8. The system as claimed claim 6, the machining module comprising a measuring and compensating device configured for measuring the distance of the tool-holder with respect to a reference linked to the workpiece-carrier and for compensating for a difference with respect to said distance of the tool-holder with respect to said reference linked to the workpiece-carrier, said distance being measured on the setting-up module, so as to ensure a relative positioning of the tool-holder and the workpiece-carrier which is identical to that applied during setting up on the setting-up module.

9. The system as claimed in claim 7, the machining module comprising a detector which detects the direction of movement of the tool-holder in a reference frame linked to the workpiece-carrier and a compensating device which compensates for a difference with respect to the direction measured on the setting-up module.

10. The system as claimed in claim 1, wherein said position correction devices of the setting-up module are adapted to compensate for the relative position of the tool-holder with respect to the workpiece-carrier.

11. The system as claimed in claim 2, wherein said position correction devices of the setting-up module are adapted to compensate for the relative position of the tool-holder with respect to the workpiece-carrier and wherein said position correction devices of the setting-up module are adapted to obtain a relative positioning and orientation of the tool-holder and of the workpiece-carrier corresponding to the reference values of the setting-up module.

12. The system as claimed in claim 1, said setting-up module comprising a camera or a high-resolution sensor not provided on the machining module, in order to set up the machining on said setting-up module.

13. The system as claimed in claim 1, comprising sensors and/or measurement systems for assisting with the setting up.

14. The system as claimed in claim 1, wherein said second positioning control device is arranged in order to check that the relative positioning of the workpiece-carrier and the tool-holder corresponds to a predefined value, and to modify it if this is not the case.

* * * * *